United States Patent
Kim et al.

(10) Patent No.: US 6,751,446 B1
(45) Date of Patent: Jun. 15, 2004

(54) MOBILE TELEPHONY STATION WITH SPEAKER PHONE FUNCTION

(75) Inventors: Hong Joo Kim, Seoul (KR); Hee Bong Park, Kunpo-shi (KR); Nam Sik Joo, Seoul (KR); Sin Woo Kim, Seoul (KR); Keun Taek Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 386 days.

(21) Appl. No.: 09/606,543

(22) Filed: Jun. 30, 2000

(30) Foreign Application Priority Data

| Jun. 30, 1999 | (KR) | 1999-12353 |
| Dec. 7, 1999 | (KR) | 1999-55575 |
| Dec. 20, 1999 | (KR) | 1999-59320 |

(51) Int. Cl.<sup>7</sup> ............................................. H04B 1/38
(52) U.S. Cl. ............. 455/90.1; 455/550; 455/575.1; 455/347; 455/350; 455/569; 455/569.1; 379/433.13; 379/433.02; 379/433.06; 379/420.02; 379/433.12
(58) Field of Search ................ 379/433.13, 433.02, 379/433.06, 420.02, 433.12; 455/550, 575.1, 90.1, 350, 347, 569, 569.1

(56) References Cited

U.S. PATENT DOCUMENTS

| 6,104,808 | A | * | 8/2000 | Alameh et al. | 379/433.02 |
| 6,314,183 | B1 | * | 11/2001 | Pehrsson et al. | 379/433.06 |
| 6,356,538 | B1 | * | 3/2002 | Li | 370/311 |
| 6,359,984 | B1 | * | 3/2002 | Kim | 379/433.02 |
| 6,434,371 | B1 | * | 8/2002 | Claxton | 455/90 |

* cited by examiner

*Primary Examiner*—Sinh Tran
*Assistant Examiner*—David Nguyen
(74) *Attorney, Agent, or Firm*—McKenna Long & Aldridge LLP

(57) ABSTRACT

Mobile telephony station with a speaker phone function including a front panel having a plurality of menu selecting keys for selecting menu, an LCD panel for displaying various information and messages, a mike for putting in a transmission speech, and a first speaker for presenting a received speech, a flip hinged on the front panel for protecting the LCD panel, a sensor switch on the front panel for sensing opening/closing of the flip, and a second speaker for selectively presenting a received speech, together with the first speaker, depending on a switching state of the sensor switch, to carry out the speaker phone function, thereby permitting to select the speaker phone function automatically at opening a flip, in a setting mode, or by using a toggle switch.

9 Claims, 9 Drawing Sheets

MOBILE TELEPHONY STATION WITH SPEAKER PHONE FUNCTION

CROSS REFERENCES TO RELATED APPLICATIONS

This application claims priority from Korean Patent Application No. 1999-12353 filed on Jun. 30, 1999, Korean Patent Application No. 1999-55575 filed on Dec. 7, 1999, and Korean Patent Application No. 1999-59320 filed on December 20, 1999, the entirety of each of which is hereby incorporated by reference for all purposes as if fully set forth therein.

BACKGROUND OF THE INVENTION

1. Field of the Invention

The present invention is related to a mobile telephony station, and more particularly, to a mobile telephony station with a speaker phone function.

2. Background of the Related Art

Recently, due to active sales of mobile telephony stations, use of mobile telephony stations is widespread without restriction on area, time and space. However, mobile telephony stations with a speaker phone function are not widespread. Because of this, the user experiences inconvenience in the use of the mobile telephony station, and can not carry out other work during a conversation, as the user must hold the mobile telephony station in hand during the conversation if the user does not uses an earphone. And, sometimes, there are cases when a call should be made by using the mobile telephony station during a meeting, which should be heard by all the participants of the meeting. However, unless other equipment is employed, this is not possible as the mobile telephony station has no speaker function. Because of this need, there has been a mobile telephony station with a speaker phone function suggested recently, wherein only one speaker is provided to be used in a receiver mode of a telephone as usual and in a speaker phone mode. The mobile telephony station with the speaker phone function provided with one speaker requires an additional key for enabling the speaker phone function. And, in order to make the speaker to serve both for the receiver function and the speaker phone function, the speaker should be placed in a receiver position (facing a user's ear) of the mobile telephony station, and the speaker should be high powered, requiring the speaker to be large sized. Accordingly, the mobile telephony station also should be large sized. And, because the one speaker is used both in the receiver mode and in the speaker phone mode, if the user puts the mobile telephony station close to his or her ear while the mobile telephony station is in the speaker phone mode, mistakenly thinking that the mobile telephony station is in the regular telephone receiver mode, then the loud sound from the speaker will surprise the user.

SUMMARY OF THE INVENTION

Accordingly, the present invention is directed to a mobile telephony station with a speaker phone function that substantially obviates one or more of the problems due to limitations and disadvantages of the related art.

An object of the present invention is to provide a mobile telephony station with a speaker phone function, in which the speaker phone function can be selected automatically by opening a flip cover, in a setting mode, or by using a toggle switch.

Another object of the present invention is to provide a mobile telephony station with a speaker phone function, having a minimum size.

Yet another object of the present invention is to provide a mobile telephony station with a speaker phone function, which can forward a sound from the speaker to the outside of the mobile telephony station even if the mobile telephony station is put on a floor, with a speaker side face of the mobile telephony station faced down.

A further object of the present invention is to provide a mobile telephony station with a speaker phone function, which permits the user to make communication with another party while performing daily schedule management or making a note via the mobile telephony station, and allows many people to have a teleconference communication regardless of place or time.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purposes of the present invention, as embodied and broadly described, a mobile telephony station with a speaker phone function includes a flip cover movably fitted to a body, a sensor switch for sensing opening/closing of the flip cover, and a controller for switching to a speaker phone mode if the sensor switch senses that the flip cover is opened.

In another aspect of the present invention, there is provided a mobile telephony station with a speaker phone function including a controller for controlling general operation of the mobile telephony station and carrying out the speaker phone function according to a state of a sensor switch for sensing opening/closing of the flip cover, a selecting switch, or a menu selection, a CODEC for receiving, and demodulating a digitized, compressed and modulated audio signal into an original signal, and converting it into an analog signal, and compressing, modulating, and digitizing an analog audio signal to be transmitted into a state required for transmission under control of the controller, a duplex controller for selectively receiving/forwarding only one of the audio signals received/transmitted from/to the CODEC in the speaker phone mode, a microphone for inputting an audio signal intended to be transmitted into the duplex controller or the CODEC directly, a first speaker for outputting an audio signal received from the CODEC in a regular telephone mode, and a second speaker for outputting an audio signal received through the duplex controller in the speaker phone mode.

In yet another aspect of the present invention, there is provided a mobile telephony station with a speaker phone function including a controller for controlling operation of the mobile telephony station, and to carry out a speaker phone function according to a regular mode or a speaker phone mode selected by a user, a vocoder for receiving and demodulating a compressed and modulated audio signal into an original signal, or receiving, compressing, and modulating an audio signal into a state required for transmission under control of the controller, an audio CODEC for converting a digital received audio signal demodulated by and provided from the vocoder into an analog signal while filtering a noise component added during transmission, converting an analog audio signal to be transmitted into a digital audio signal, and removing an echo between a speaker and the microphone in the speaker phone mode, a microphone for inputting an audio signal into the audio CODEC, a first amplifier for amplifying the audio signal from the audio CODEC to a preset level and presenting it through a receiver in a regular mode under the control of the controller, and a second amplifier for amplifying the audio signal from the audio CODEC to a preset level and presenting it through a speaker for exclusive use in the speaker phone mode under the control of the controller.

In a still further aspect of the present invention, there is provided a mobile telephony station with a speaker phone function including a front panel having a plurality of menu selecting keys for selecting a menu, an LCD panel for displaying various information and messages, a microphone for inputting speech for transmission, and a first speaker for presenting or reproducing received speech, a sensor switch, on the front panel for sensing opening/closing of the flip cover, and a second speaker for selectively presenting or reproducing the received speech, together with the first speaker, depending on a switching state of the sensor switch, to carry out the speaker phone function.

The second speaker is fitted into a recess with a streamlined curvature in horizontal and vertical directions of the back face of the back panel, with a ridge sloped radially around the recess formed in a center portion of the back panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

First Embodiment

Figure 1:
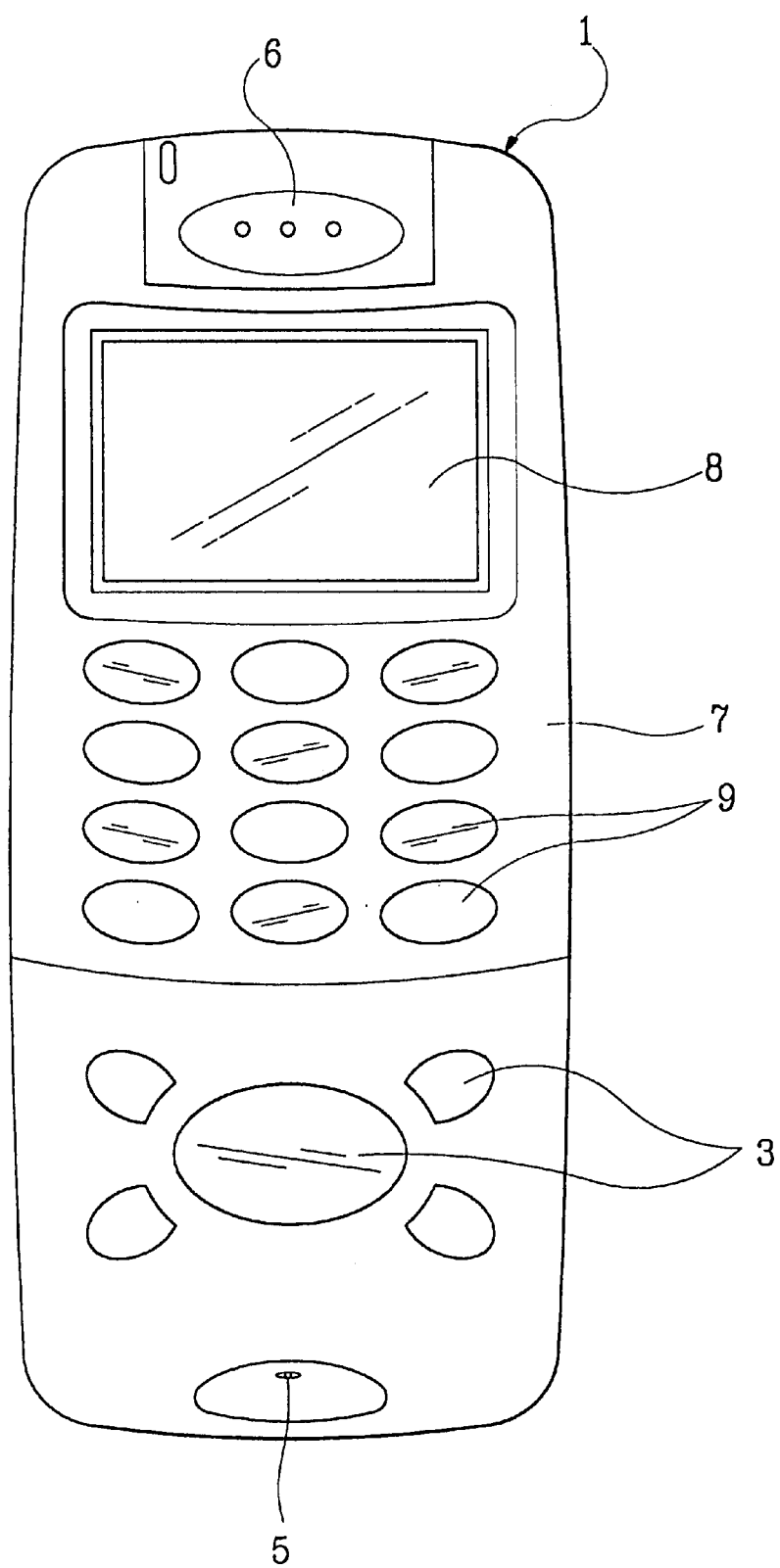
FIG. 1 illustrates a front view of a mobile telephony station with a speaker phone function in accordance with a first preferred embodiment, with a flip cover closed.
Figure 2:
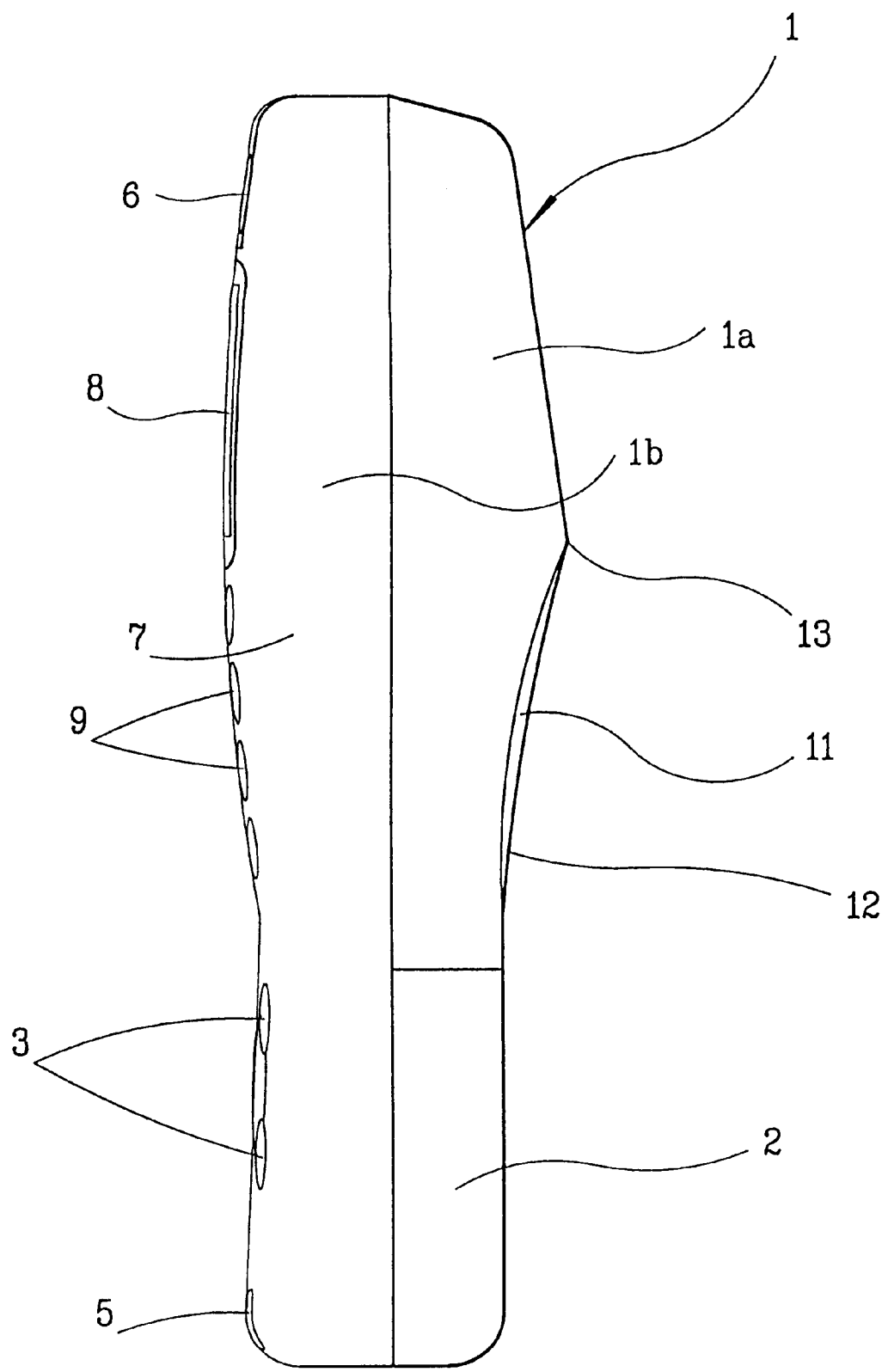
FIG. 2 illustrates a side view of a mobile telephony station with a speaker phone function in accordance with a first preferred embodiment, with a flip cover closed.
Figure 3:
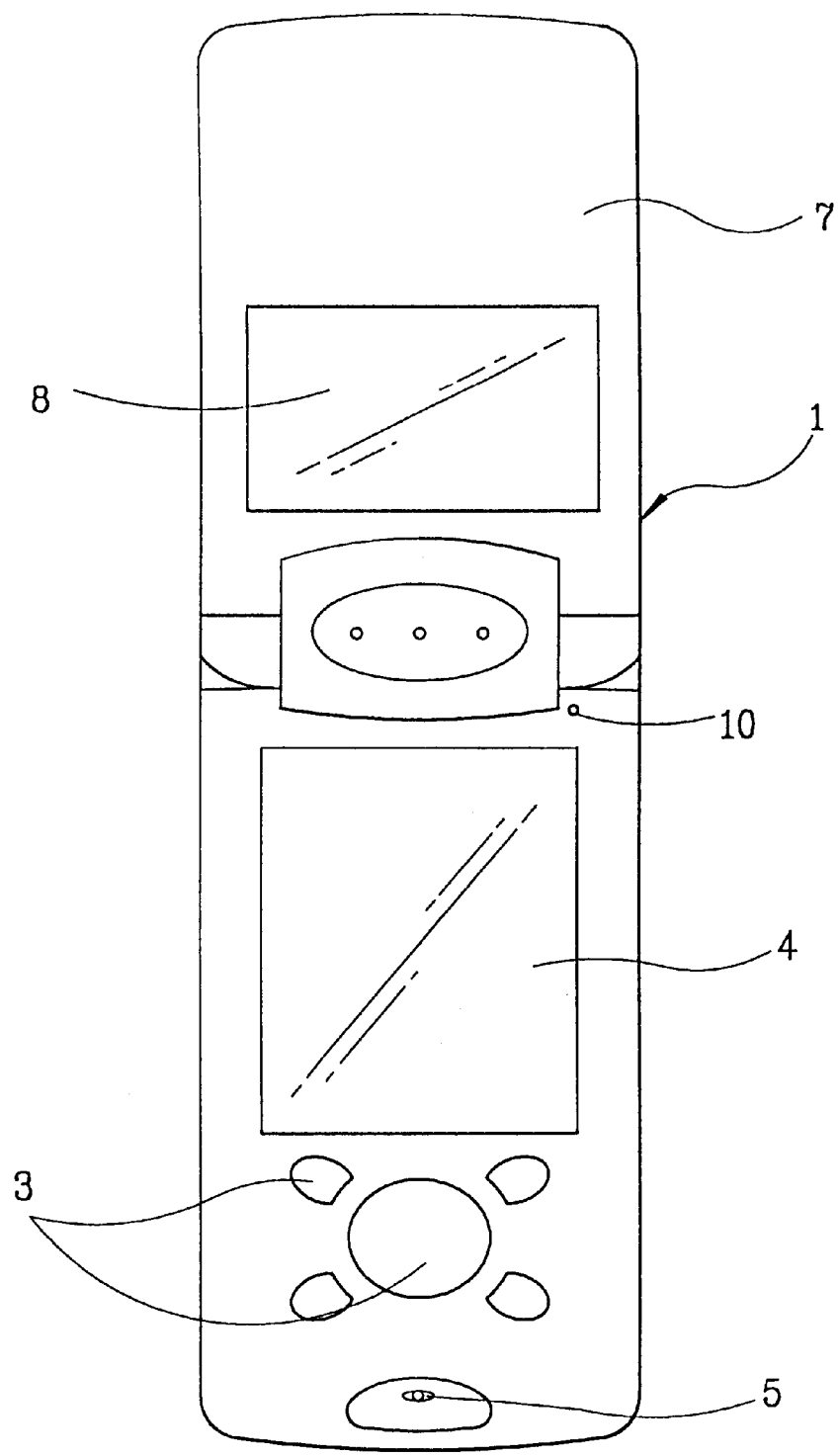
FIG. 3 illustrates a front view of a mobile telephony station with a speaker phone function in accordance with a first preferred embodiment, with a flip cover opened.
Figure 4:
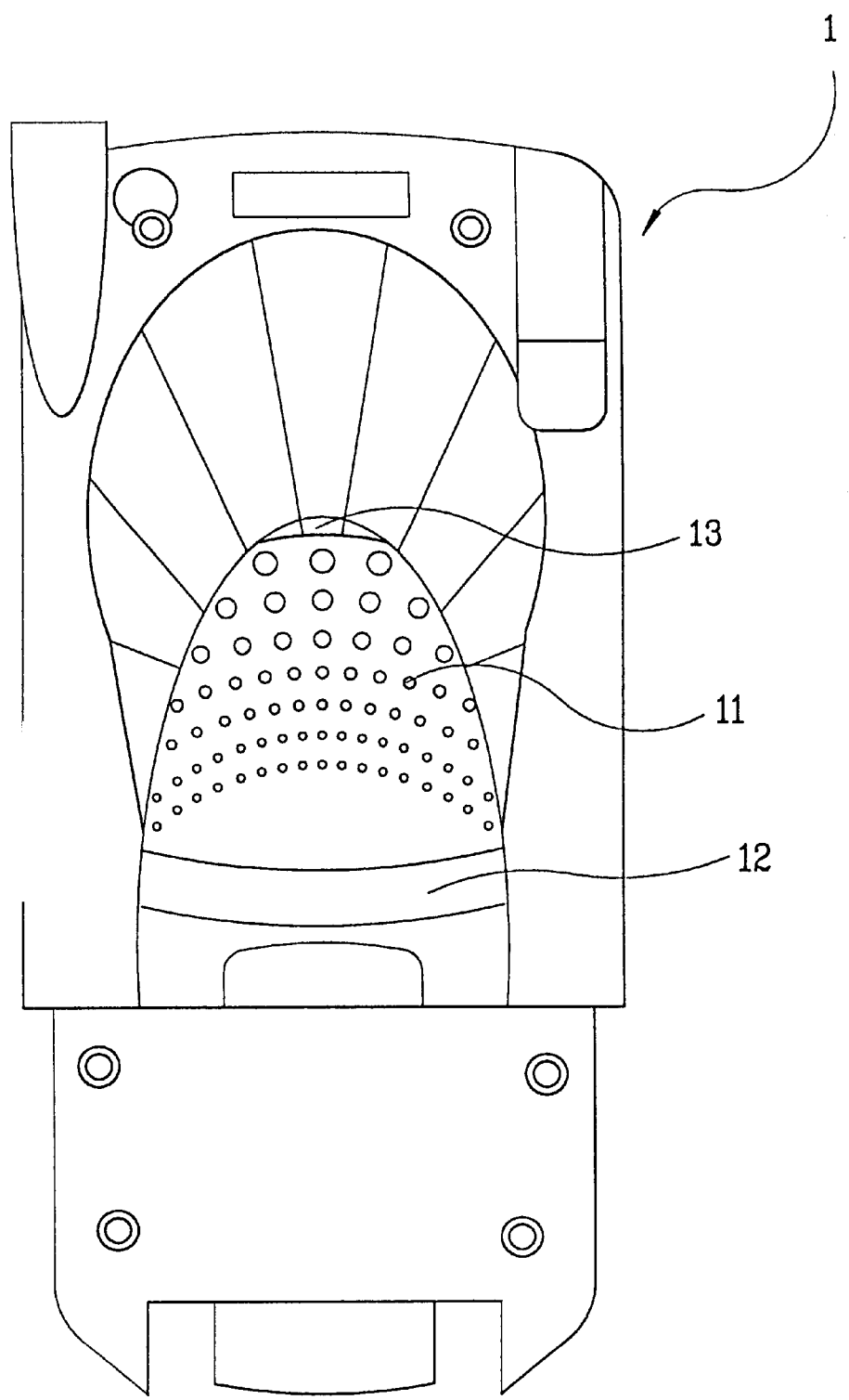
FIG. 4 illustrates a back view of a mobile telephony station with a speaker phone function in accordance with a first preferred embodiment.

FIG. 1 illustrates a front view of a mobile telephony station with a speaker phone function in accordance with a first preferred embodiment with a flip cover closed, FIG. 2 illustrates a side view of a mobile telephony station with a speaker phone function in accordance with a first preferred embodiment with a flip cover closed, FIG. 3 illustrates a front view of a mobile telephony station with a speaker phone function in accordance with a first preferred embodiment with a flip cover opened, and FIG. 4 illustrates a back view of a mobile telephony station with a speaker phone function in accordance with a first preferred embodiment. The external construction of the mobile telephony station with a speaker function in accordance with a first preferred embodiment will be explained.

A body 1 of the mobile telephony station with a speaker function in accordance with a first preferred embodiment includes a back panel 1a and a front panel 1b. A battery 2F is detachably fitted to a back of the body 1 below the back panel 1a for supplying power to the mobile telephony station, and there are provided a plurality of menu selecting keys 3 for selecting a menu, an LCD panel 4 for displaying various information and messages, a microphone 5 for inputting speech for transmission, and a first speaker (receiver) 6 for supplying received speech to a front face of the front panel 1b of the body 1. Also, there is a flip cover 7 in the front face of the body 1 hinged thereto for protecting the LCD panel 4, provided with a window 8 for revealing a portion of the LCD panel 4 outside of the body 1 and a plurality of message input keys 9 in a front face of the flip cover 7. Further, there are one or more sensors in the form of sensor switches 10 in appropriate positions of the front face of the front panel 1b for sensing the flip cover 7 being in an opened or closed position as the flip cover 7 moves away therefrom or comes into contact thereto. A second speaker 11 is provided in a back face of the back panel 1a of the body 1 for selectively supplying the received speech together with the first speaker 6, depending on a switched state of one or more of the sensor switches 10, to serve as a speaker phone. Alternatively, the second speaker 11 may be fitted not only to the back face of the back panel 1a, but to any position of the body 1, such as the front or sides of the body 1. There is a recess 12 with a streamlined curvature in horizontal and vertical directions of the back face of the back panel 1a of the body 1, the second speaker 11 in the recess 12, and a ridge 13 sloped radially around the recess 12 which is formed in a center portion of the back panel 1a. Therefore, even if a conversation is conducted by using the speaker phone function while the body 1 is laid on a flat surface, like a table, the ridge 13 provide a space between the mobile telephony station and the table, thereby permitting a smooth and undistorted presentation of the received speech from the second speaker 11.

Figure 5:
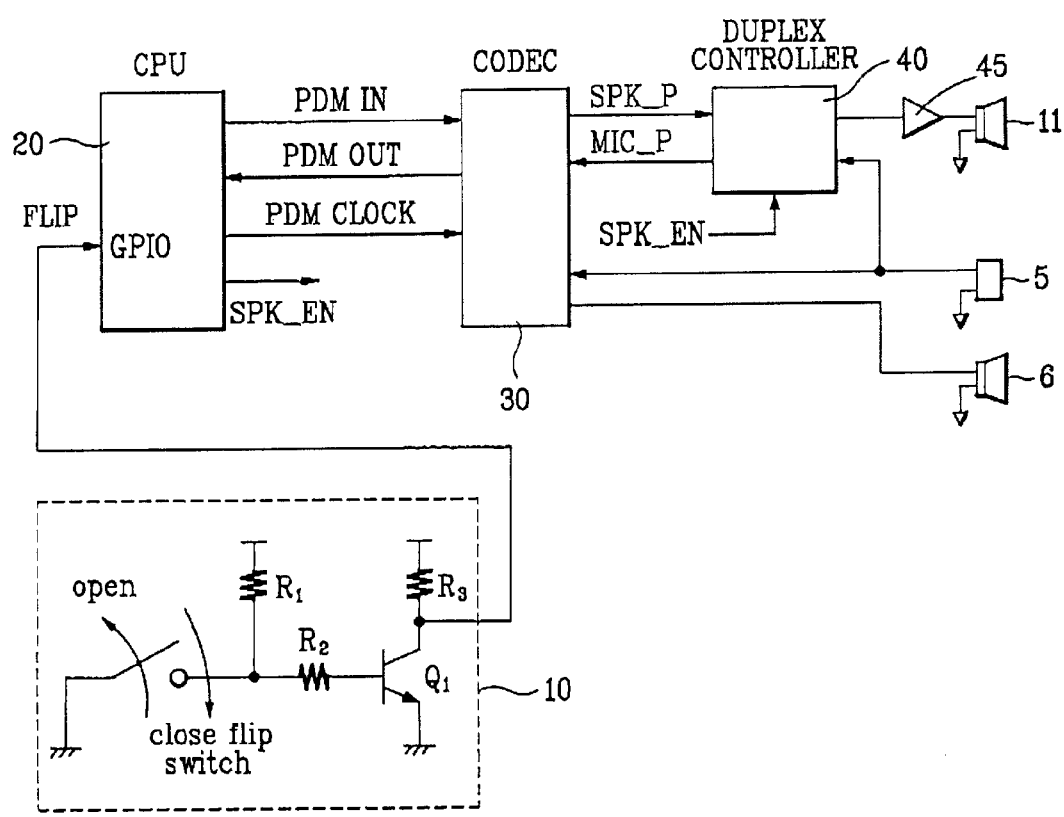
FIG. 5 illustrates a circuit of a mobile telephony station with a speaker phone function in accordance with a first preferred embodiment.

A circuit of the mobile telephony station with a speaker phone function in accordance with a first preferred embodiment will be explained. FIG. 5 illustrates a circuit of a mobile telephony station with a speaker phone function in accordance with a first preferred embodiment.

The mobile telephony station, such as a cellular phone, a PCS, a PDA, or a smart phone, with a speaker phone function in accordance with a first preferred embodiment includes, as described before, at least one sensor switch 10 for sensing opened and closed states of a flip cover 7. The sensor switch(es) 10 switch in response to the flip cover 7 being opened and closed. The mobile telephony station also includes a controller 20 for controlling general operation of the mobile telephony station, such as a call set-up, a location registration, and schedule and memo management and other supplementary services, and to conduct a speaker phone function automatically depending on a sensed state of the sensor switch 10 in the mobile telephony station. The mobile telephony station also includes: a coder/decoder (CODEC) 30 for receiving and demodulating a digitized, compressed and modulated audio signal into an original audio signal and converting it into an analog audio signal, and for compressing, modulating, and digitizing an analog audio signal to be transmitted into a state or format required for transmission, and filtering a noise component added in the course of transmission; a duplex controller 40 for selectively receiving and forwarding only one of the audio signals received from or transmitted to the CODEC 30 in the speaker phone mode; a microphone 5, as described before, fitted to a front panel 1b for inputting an audio signal intended for transmission into the duplex controller 40 or the CODEC 30 directly; a first speaker 6, as described before, fitted to the front panel 1b for outputting an audio signal received from the CODEC 30 in a regular telephone mode; and a second speaker 11, as described before, fitted to a back panel 1a for outputting an audio signal received through the duplex controller 40 in the speaker phone mode. The reference symbol 45 denotes an amplifier, which may be supplied not only to the second speaker 11, but also to the microphone 5, or the first speaker 6.

The operation of the mobile telephony station with a speaker phone function in accordance with a first preferred embodiment will be explained.

In a state wherein the flip cover 7 is not opened, the mobile telephony station with a speaker phone function in accordance with a first preferred embodiment is used as a general mobile telephony station. In a state wherein the flip cover 7 is opened, the mobile telephony station can be used in a speaker phone mode.

TABLE 1

|  | Sensor switch signal | Speaker phone |
|---|---|---|
| Flip cover opened | High | Enable |
| Flip cover closed | Low | Disable |

Upon opening the flip cover 7, the sensor switch 10 is turned off, to provide a "high" signal to the controller 20, that enables the speaker phone function. Conversely, if the flip cover 7 is closed, the sensor switch 10 is turned on, to provide a "low" signal to the controller 20, that disables the speaker phone function, causing the mobile telephony station to operate in the regular telephone mode. Thus, under the control of the controller 20, the CODEC 30 receives, demodulates, and converts a digitized, compressed, and modulated audio signal into an original audio signal, and compresses, modulates, and digitizes an analog audio signal to be transmitted into a state required for transmission, and filters a noise component added in the course of transmission. In the speaker phone mode, the duplex controller 40 selectively receives and forwards either the audio signal transmitted from the microphone 5 to the CODEC 30, or forwards the audio signal from the CODEC 30 toward the second speaker 11, thereby permitting the mobile telephony station to carry out the speaker phone function. And, under the control of the controller 20, the received audio signal provided from the CODEC 30 is presented to the first speaker 6.

Second Embodiment

Figure 6:
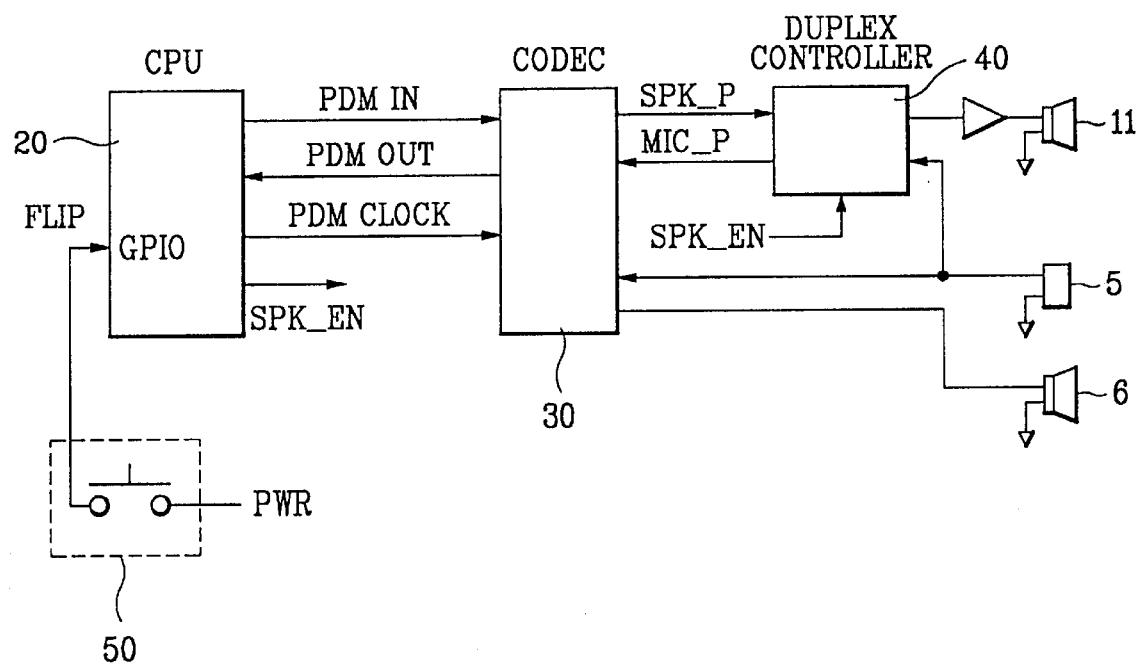
FIG. 6 illustrates a circuit of a mobile telephony station with a speaker phone function in accordance with a second preferred embodiment.
Figure 7:
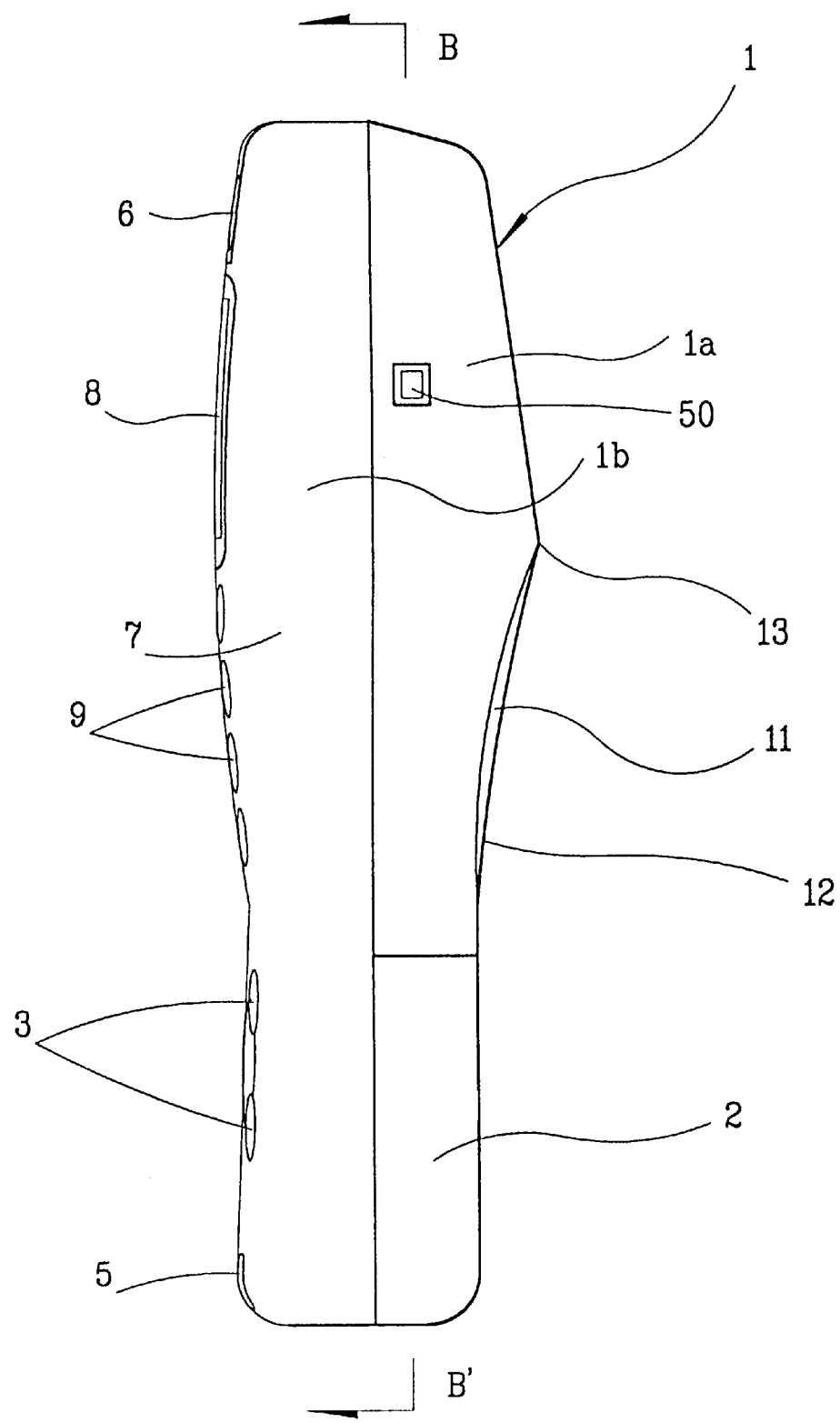
FIG. 7 illustrates a side view of a mobile telephony station with a speaker phone function in accordance with a second preferred embodiment.
Figure 8:
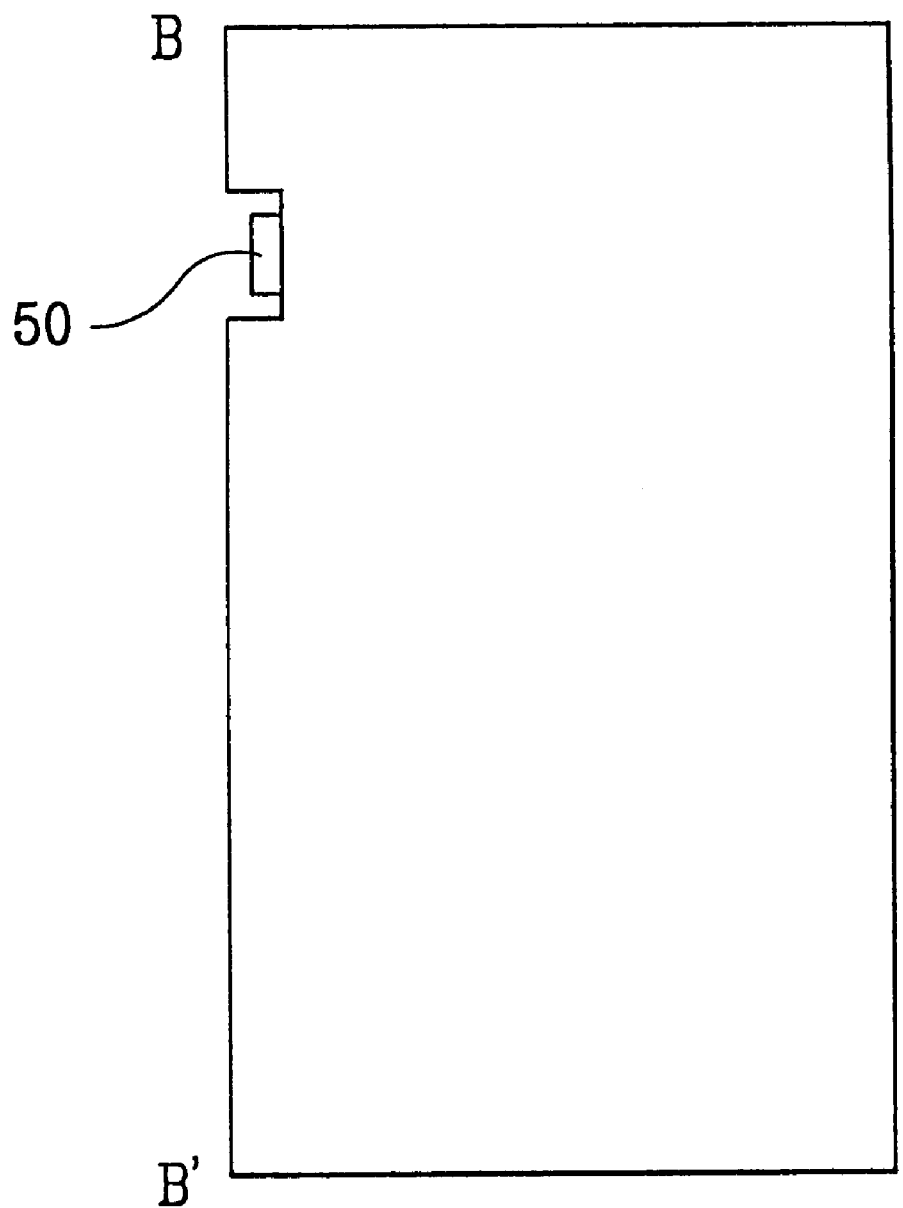
FIG. 8 illustrates a front view of a mobile telephony station with a speaker phone function in accordance with a second preferred embodiment schematically; and, FIG. 9 illustrates a circuit of a mobile telephony station with a speaker phone function in accordance with a fourth preferred embodiment.

A mobile telephony station, such as a cellular phone, a PCS, a PDA, or smart phone, with a speaker phone function in accordance with a second preferred embodiment will be explained. FIG. 6 illustrates a circuit of a mobile telephony station with a speaker phone function in accordance with a second preferred embodiment, FIG. 7 illustrates a side view of a mobile telephony station with a speaker phone function in accordance with a second preferred embodiment, and FIG. 8 illustrates a front view of a mobile telephony station with a speaker phone function in accordance with a second preferred embodiment, schematically. The external construction of the mobile telephony station with a speaker phone function in accordance with a second preferred embodiment is the same with the first embodiment mobile telephony station, except that a toggle switch 50 is provided to the body 1 of the mobile telephony station, for selecting the speaker phone function.

Referring to FIG. 6, a circuit of the mobile telephony station with a speaker phone function in accordance with a second preferred embodiment includes: a toggle switch 50 adapted to be toggled by user's selection; a controller 20 for controlling general operation of the mobile telephony station, such as setting up a call, registering a location, and schedule and memo management and other supplementary services, and to conduct a speaker phone function automatically depending on a toggled state of the toggle switch 50 in the mobile telephony station: a CODEC 30 for receiving and demodulating a digitized, compressed and modulated audio signal into an original audio signal and converting it into an analog audio signal, and compressing, modulating, and digitizing an analog audio signal to be transmitted into a state required for transmission, and filtering a noise component added in the course of transmission; a duplex controller 40 for selectively receiving and forwarding only one of the audio signals either received from or transmitted from to the CODEC 30 in the speaker phone mode; a microphone 5, as described before, fitted to a front panel 1b for inputting an audio signal intended to be transmitted into the duplex controller 40 or the CODEC 30 directly; a first speaker 6, as described before, fitted to the front panel 1b for outputting an audio signal received from the CODEC 30 in a regular telephone mode; and a second speaker 11, as described before, fitted to a back panel 1a a for outputting an audio signal received through the duplex controller 40 in a speech in the speaker phone mode. As shown in FIGS. 7 and 8, the toggle switch 50 is fitted to a side of the mobile telephony station body 1 recessed from a surface of the body 1.

The operation of the mobile telephony station with a speaker phone function in accordance with a second preferred embodiment will be explained.

When the user presses the toggle switch 50, the controller 20 sets up the speaker phone mode to carry out the speaker phone function as explained in the first preferred embodiment, and, when the user presses the toggle switch 50 again, the controller 20 sets up the regular telephone mode. As the toggle switch is recessed from the surface of the mobile telephony station, a malfunction caused by the user can be prevented.

Third Embodiment

A mobile telephony station with a speaker phone function in accordance with a third preferred embodiment has the same construction as the first or second embodiment, except that the speaker phone function is carried out, not depending on the state of the flip cover or a position of the toggle switch, but by using a menu selecting key entered via the menu selecting keys 3 or a keypad of the mobile telephony station.

Fourth Embodiment

Figure 9:
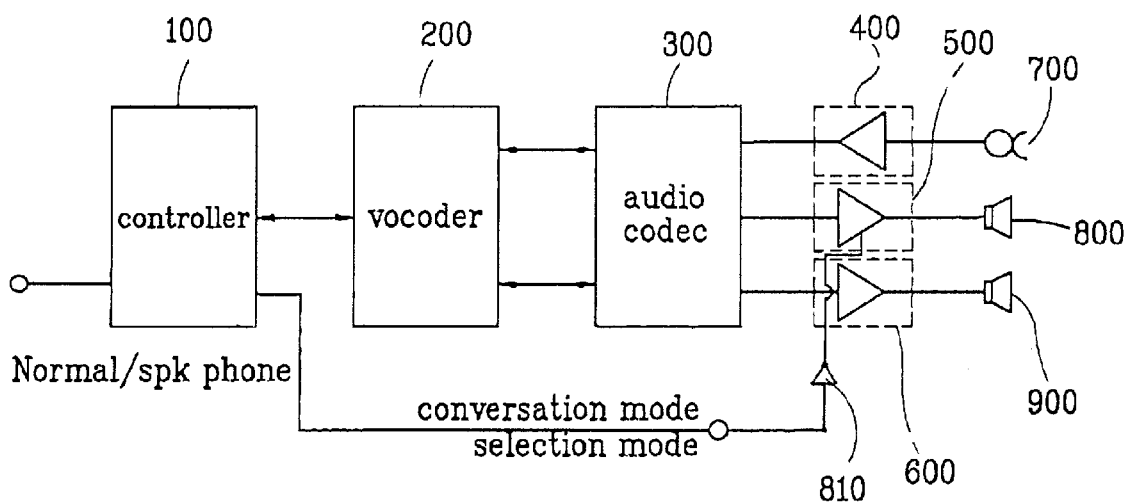

A mobile telephony station with a speaker phone function in accordance with a third preferred embodiment will be explained. FIG. 9 illustrates a circuit of a mobile telephony station with a speaker phone function in accordance with a fourth preferred embodiment.

Referring to FIG. 9, a circuit of the mobile telephony station with a speaker phone function in accordance with a fourth preferred embodiment includes: a controller 100 for controlling general operation of the mobile telephony station, such as setting up a call, registering a location, schedule and memo managements or providing supplementary services, and the like, and to carry out a speaker phone function in response to a selecting signal from a key pad (regular mode), or according to a speaker phone mode; a vocoder 200 for receiving, and demodulating a compressed and modulated audio signal into an original audio signal, or receiving, compressing, and modulating an audio signal into a state required for transmission under the control of the controller 100; an audio CODEC 300 for converting a digital received audio signal demodulated by and provided from the vocoder 200 into an analog signal, while filtering a noise component added in the course of transmission, and converting an analog audio signal to be transmitted into a digital audio signal, and removing an echo between a speaker and the microphone in the speaker phone mode; a first amplifier 500 for amplifying the audio signal from the audio CODEC 300 to a preset level and presenting through it a receiver speaker in a regular mode under the control of the controller 100; a second amplifier 600 for amplifying the audio signal from the audio CODEC 300 to a preset level and presenting or reproducing it through a speaker 900 for exclusive use in a speaker phone mode under the control of the controller 100; a microphone 700 for inputting an audio signal into the audio CODEC 300; and a third amplifier 400 for amplifying a signal from the microphone 700 to a preset level. The reference symbol 810 denotes an inverter.

The operation of the mobile telephony station with a speaker phone function in accordance with a fourth preferred embodiment will be explained.

When the user selects a regular mode through the key pad, the controller 100 provides a "low" signal to put the first amplifier 500 into operation, while the second amplifier 600 is left inoperative, so that the audio signal is supplied only to the receiver speaker 800, but not to the speaker 900. Conversely, when the user selects the speaker phone mode through the key pad, the controller 100 provides a "high" signal, to put the second amplifier 600 into operation, while the first amplifier 500 is left inoperative, so that the audio signal is not supplied to the receiver 800, but only to the speaker 900.

As has been explained, the mobile telephony station with a speaker phone function has the following advantages.

First, because the speaker phone function provided to the mobile telephony station permits conversation without holding the mobile telephony station in hand, and even without using the earphone, use of the mobile telephony station is convenient, participants of a meeting can hear the conversation on the same time, and the user can perform other work during a conversation. In a case of a mobile telephony station such as a smart phone, which has a large sized touch panel and a variety of functions similar to a computer to require touching on the touch panel during the conversation, the speaker phone function provided to the mobile telephony station permits the user to put the mobile telephony station on a table for a conversation while required data is input and searched.

Second, because two speakers are employed, using one speaker as a receiver speaker of a regular telephone exclusively and the other speaker as a speaker phone exclusively, and the speaker phone mode is selected automatically depending on opening/closing of the flip cover, the first embodiment requires no additional key for enabling the speaker phone function, and, since the second speaker for the speaker phone function is fitted to a back of the mobile telephony station, prevents occurrence of a case when the user is surprised even if the user puts the mobile telephony station close to his or her ear while the flip cover is opened, mistakenly believing that the mobile telephony station is in the regular telephone receiver mode.

Third, even though the first speaker for a regular receiver function and the second speaker for the speaker phone function are provided separately, the speakers do not affect to the size of the mobile telephony station much since the second speaker is fitted to a back panel of the mobile telephony station.

Fourth, because the second speaker for the speaker phone function is fitted into a recess of the back panel, with a radially sloped ridge around the recess to provide a space between the mobile telephony station and a table on which it is placed, even if the mobile telephony station is placed on a table, the received speech can be presented smoothly from the second speaker to the outside of the mobile telephony station.

Fifth, because the speaker phone function can be selected by using a toggle switch as described in the second embodiment, the response can be made quickly according to a situation by pressing the toggle switch only once, to permit easy use by handicapped people, especially blind individuals.

It will be apparent to those skilled in the art that various modifications and variations can be made in the mobile telephony station with a speaker phone function as described herein without departing from the spirit or scope of the present invention. Thus, it is intended that the present invention cover the modifications and variations of this invention provided they come within the scope of the appended claims and their equivalents.

What is claimed is:

1. A mobile telephony station with a speaker phone function, comprising:

a flip cover movably connected to a body;

a sensor for sensing an open state and a closed state of the flip cover;

a controller for placing the mobile telephony station in a speaker phone mode in response to the sensor sensing that the flip cover is in the open state;

a CODEC for receiving and demodulating a digitized, compressed and modulated audio signal into an original signal and converting into an analog signal, and for compressing, modulating, and digitizing an analog audio signal to be transmitted into a state required for transmission;

a duplex controller for, in the speaker phone mode, selectively receiving and forwarding only one of the received audio signal from the CODEC, and the audio signal to be transmitted to the CODEC;

a microphone for directly inputting the audio signal intended to be transmitted into one of the duplex controller and the CODEC;

a first speaker for reproducing an analog audio signal received from the CODEC when the mobile telephony unit is in a regular telephone mode; and a second speaker for reproducing an analog audio signal received through the duplex controller when the mobile telephony unit is in the speaker phone mode.

2. A mobile telephony station with a speaker phone function, comprising:
- a front panel having a plurality of menu selecting keys for selecting a menu, an LCD panel for displaying information and messages, a microphone for inputting speech to be transmitted, and a first speaker for reproducing received speech;
- a flip cover hinged on the front panel for protecting the LCD panel;
- a sensor switch on the front panel for sensing opening and closing of the flip cover;
- a second speaker for selectively reproducing the received speech, together with the first speaker, depending on a switching state of the sensor switch, to carry out the speaker phone function; and
- a CODEC for receiving and demodulating a digitized, compressed and modulated audio signal into an original signal and converting into an analog signal, and for compressing, modulating, and digitizing an analog audio signal to be transmitted into a state required for transmission;
- wherein the second speaker is fitted in a recess with a streamlined curvature in horizontal and vertical directions of the back face of the back panel, with a ridge sloped radially around the recess formed in a center portion of the back panel.

3. A mobile telephony station with a speaker phone function, comprising:
- a mode selecting means for selecting the speaker phone mode;
- a controller for switching to a speaker phone mode according to a state of the mode selecting means;
- a coder/decoder (CODEC) for, under the control of the controller,
    - receiving, and demodulating a digitized, compressed and modulated audio signal into an original audio signal, and
    - converting the original audio signal into an analog audio signal, and
    - compressing, modulating, and digitizing an analog audio signal to be transmitted into a state required for transmission;
- a duplex controller for, in the speaker phone mode, selectively receiving and forwarding only one of the received audio signal from the CODEC, and the audio signal to be transmitted to the CODEC;
- a microphone for directly inputting the audio signal intended to be transmitted into one of the duplex controller and the CODEC;
- a first speaker for reproducing an analog audio signal received from the CODEC when the mobile telephony unit is in a regular telephone mode; and
- a second speaker for reproducing an analog audio signal received through the duplex controller when the mobile telephony unit is in the speaker phone mode.

4. A mobile telephony station as claimed in claim 3, wherein the mode selecting means is selected by pressing a key.

5. A mobile telephony station as claimed in claim 4, wherein the key is a toggle switch.

6. A mobile telephony station as claimed in claim 3, wherein the mode selecting means is fitted to a side of the mobile telephony station in a recess from a surface.

7. A mobile telephony station as claimed in claim 3, wherein the mode selecting means is selected by a selecting key for selecting the speaker phone function in a form of menu.

8. A mobile telephony station with a speaker phone function, comprising:
- a controller for controlling operation of the mobile telephony station to carry out the speaker phone function according to a regular mode or a speaker phone mode selected by a user;
- a vocoder for, under the control of the controller,
    - receiving and demodulating a compressed and modulated audio signal into an original audio signal, and
    - receiving, compressing, and modulating a digital audio signal to be transmitted into a state required for transmission;
- an audio coder/decoder (CODEC) for converting the original signal provided from the vocoder into a received analog audio signal and filtering a noise component added in transmission, and converting an analog audio signal to be transmitted into the digital audio signal to be transmitted;
- a microphone for providing to the audio CODEC the analog audio signal to be transmitted;
- a first amplifier for amplifying the received audio signal from the audio CODEC to a preset level and reproducing the received audio signal through a receiver in the regular mode under the control of the controller; and
- a second amplifier for amplifying the received audio signal from the audio CODEC to a preset level and reproducing the received audio signal through a speaker exclusively in the speaker phone mode under the control of the controller,
- wherein, in the speaker phone mode, the audio CODEC removes an echo between the speaker and the microphone.

9. A mobile station with a speaker phone function, comprising:
- a front panel having a plurality of menu selecting keys for selecting menu, an LCD panel for displaying various information and messages, a mike for putting in a transmission speech, and a first speaker for presenting a received speech;
- a flip hinged on the front panel for protecting the LCD panel;
- a sensor switch on the front panel for sensing opening/closing of the flip; and
- a second speaker for selectively presenting a received speech, together with the first speaker, depending on a switching state of the sensor switch, to carry out the speaker phone function, wherein the second speaker is fitted in a recess with a streamlined curvature in horizontal and vertical directions of the back face of the back panel and a ridge sloped radially around the recess formed in a center portion of the back panel.

* * * * *